(12) United States Patent
Danley et al.

(10) Patent No.: US 9,268,101 B2
(45) Date of Patent: Feb. 23, 2016

(54) OPTICAL FIBER AND COMPOSITE INORGANIC FERRULE ASSEMBLIES

(71) Applicant: CORNING OPTICAL COMMUNICATIONS LLC, Hickory, NC (US)

(72) Inventors: Jeffrey Dean Danley, Hickory, NC (US); Robert Bruce Elkins, II, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/281,991

(22) Filed: May 20, 2014

(65) Prior Publication Data

US 2015/0309268 A1     Oct. 29, 2015

Related U.S. Application Data

(62) Division of application No. 13/788,861, filed on Mar. 7, 2013, now Pat. No. 8,764,314.

(60) Provisional application No. 61/660,235, filed on Jun. 15, 2012.

(51) Int. Cl.
*G02B 6/36* (2006.01)
*G02B 6/38* (2006.01)

(52) U.S. Cl.
CPC .............. *G02B 6/3861* (2013.01); *G02B 6/36* (2013.01); *G02B 6/3854* (2013.01); *G02B 6/3855* (2013.01)

(58) Field of Classification Search
CPC .................................................. G02B 6/3854
See application file for complete search history.

(56) References Cited

U.S. PATENT DOCUMENTS

| | | | |
|---|---|---|---|
| 3,501,048 A | 3/1970 | Strickland et al. | |
| 4,147,402 A | 4/1979 | Chown | 350/96.18 |
| 4,345,930 A | 8/1982 | Basola et al. | 65/102 |
| 4,510,005 A | 4/1985 | Nijman | 156/221 |

(Continued)

FOREIGN PATENT DOCUMENTS

| | | | | |
|---|---|---|---|---|
| WO | 01/61394 A1 | 8/2001 | | G02B 6/26 |
| WO | 01/61395 A1 | 8/2001 | | G02B 6/26 |

(Continued)

OTHER PUBLICATIONS

Patent Cooperation Treaty Search Report, Application No. PCT/US2013/045320, Oct. 4, 2013, 3 pages.

(Continued)

*Primary Examiner* — Uyen Chau N Le
*Assistant Examiner* — Chad Smith

(57) ABSTRACT

A pre-terminated optical fiber assembly with a ferrule having front and rear opposed faces and at least one fiber bore defined longitudinally therethrough includes a glass optical fiber is disposed within the at least one fiber bore with the fiber fused to the ferrule at a location at least 1 mm deep inside the bore. A method for fusing is also disclosed. The ferrule 14 is desirably composed of an inorganic composite material, the composite comprising a material gradient from at least 75% by volume of a first inorganic material to at least 75% by volume of second inorganic material in the radially inward direction, where the first inorganic material has a fracture toughness of at least 1 MPa·m$^{1/2}$, and the second inorganic material has a softening point of no greater than 1000° C., desirably no greater than 900° C.

30 Claims, 2 Drawing Sheets

(56) References Cited

U.S. PATENT DOCUMENTS

| | | | |
|---|---|---|---|
| 4,678,268 A | 7/1987 | Russo et al. | 350/96.18 |
| 4,781,970 A | 11/1988 | Barbee et al. | 428/210 |
| 4,859,827 A | 8/1989 | Coyle, Jr. et al. | 219/121.64 |
| 4,932,989 A | 6/1990 | Presby | 65/2 |
| 5,011,254 A | 4/1991 | Edwards et al. | 350/96.18 |
| 5,101,090 A | 3/1992 | Coyle, Jr. et al. | 219/121.68 |
| 5,226,101 A | 7/1993 | Szentesi et al. | 385/85 |
| 5,256,851 A | 10/1993 | Presby | 219/121.69 |
| 5,291,570 A | 3/1994 | Filgas et al. | 385/78 |
| 5,317,661 A | 5/1994 | Szentesi et al. | 385/31 |
| 5,421,928 A | 6/1995 | Knecht et al. | 156/153 |
| 5,559,909 A * | 9/1996 | Anderson et al. | 385/16 |
| 5,682,453 A | 10/1997 | Daniel et al. | 385/99 |
| 5,772,720 A | 6/1998 | Taira-Griffin et al. | 65/387 |
| 5,954,974 A | 9/1999 | Broer et al. | 216/2 |
| 5,966,485 A | 10/1999 | Luther et al. | 385/85 |
| 6,139,196 A | 10/2000 | Feth et al. | 385/97 |
| 6,246,026 B1 | 6/2001 | Vergeest | 219/121.72 |
| 6,282,349 B1 * | 8/2001 | Griffin | 385/81 |
| 6,361,219 B1 | 3/2002 | Blyler, Jr. et al. | 385/85 |
| 6,413,450 B1 | 7/2002 | Mays, Jr. | 264/1.27 |
| 6,416,235 B1 | 7/2002 | Rabinovich | 385/78 |
| 6,509,547 B1 | 1/2003 | Bernstein et al. | 219/121.68 |
| 6,534,741 B2 | 3/2003 | Presby | 219/121.69 |
| 6,738,544 B2 | 5/2004 | Culbert et al. | 385/33 |
| 6,742,936 B1 | 6/2004 | Knecht et al. | 385/67 |
| 6,774,341 B2 | 8/2004 | Ohta | 219/121.72 |
| 6,805,491 B2 | 10/2004 | Durrant et al. | 385/76 |
| 6,817,785 B2 | 11/2004 | Tian | 385/96 |
| 6,822,190 B2 | 11/2004 | Smithson et al. | 219/121.69 |
| 6,825,440 B2 | 11/2004 | Ohta et al. | 219/121.69 |
| 6,886,991 B2 | 5/2005 | Endo | 385/78 |
| 6,888,987 B2 | 5/2005 | Sercel et al. | 385/39 |
| 6,902,327 B1 | 6/2005 | Johnson | 385/60 |
| 6,939,055 B2 | 9/2005 | Durrant et al. | 385/76 |
| 6,951,994 B2 | 10/2005 | Mays, Jr. | 219/121.67 |
| 6,955,478 B2 | 10/2005 | Durrant et al. | 385/76 |
| 6,957,920 B2 | 10/2005 | Luther et al. | 385/85 |
| 6,960,627 B2 | 11/2005 | Huth et al. | 525/59 |
| 6,963,687 B2 | 11/2005 | Vergeest et al. | 385/123 |
| 6,968,103 B1 | 11/2005 | Schroll et al. | 385/30 |
| 7,023,001 B2 | 4/2006 | Cournoyer et al. | 250/492.1 |
| 7,029,187 B2 | 4/2006 | Chapman et al. | 385/96 |
| 7,082,250 B2 | 7/2006 | Jones et al. | 385/134 |
| 7,142,741 B2 | 11/2006 | Osborne | 385/15 |
| 7,147,384 B2 | 12/2006 | Hardcastle et al. | 385/60 |
| 7,216,512 B2 | 5/2007 | Danley et al. | 65/392 |
| 7,264,403 B1 | 9/2007 | Danley et al. | 385/60 |
| 7,267,491 B2 | 9/2007 | Luther et al. | 385/85 |
| 7,306,376 B2 | 12/2007 | Scerbak et al. | 385/76 |
| 7,324,723 B2 | 1/2008 | Shioda et al. | 385/31 |
| 7,324,724 B2 | 1/2008 | Levesque et al. | 385/31 |
| 7,377,700 B2 | 5/2008 | Manning et al. | 385/72 |
| 7,419,308 B2 | 9/2008 | Ma | 385/54 |
| 7,509,004 B2 | 3/2009 | Coleman | 385/33 |
| 7,540,668 B2 | 6/2009 | Brown | 385/78 |
| 7,630,609 B1 | 12/2009 | Mays, Jr. et al. | 385/137 |
| 7,695,201 B2 | 4/2010 | Douglas et al. | 385/85 |
| 7,802,927 B2 | 9/2010 | Benjamin et al. | 385/88 |
| 8,052,836 B2 | 11/2011 | Cale et al. | 156/712 |
| 8,101,885 B2 | 1/2012 | Nakamae et al. | 219/121.77 |
| 8,104,974 B1 | 1/2012 | Gurreri | 385/72 |
| 8,109,679 B2 | 2/2012 | Danley et al. | 385/85 |
| 8,132,971 B2 | 3/2012 | Luther et al. | 385/83 |
| 2002/0110332 A1 | 8/2002 | Clarkin et al. | 385/78 |
| 2003/0099453 A1 | 5/2003 | Moidu et al. | 385/138 |
| 2004/0234211 A1 | 11/2004 | Durrant et al. | 385/88 |
| 2005/0008307 A1 | 1/2005 | Culbert et al. | 385/123 |
| 2005/0284852 A1 | 12/2005 | Vergeest et al. | 219/121.67 |
| 2006/0137403 A1 | 6/2006 | Barr et al. | 65/377 |
| 2006/0266743 A1 | 11/2006 | Chi et al. | 219/121.69 |
| 2007/0172174 A1 | 7/2007 | Scerbak et al. | 385/76 |
| 2008/0067158 A1 | 3/2008 | Levesque | 219/121.72 |
| 2010/0101277 A1 | 4/2010 | Gonthier et al. | 65/392 |
| 2010/0215319 A1 | 8/2010 | Childers et al. | 385/60 |
| 2010/0303416 A1 | 12/2010 | Danley et al. | 385/55 |
| 2012/0014649 A1 | 1/2012 | Duis et al. | 385/65 |
| 2012/0027356 A1 | 2/2012 | Gurreri | 385/60 |
| 2012/0027358 A1 | 2/2012 | Webb et al. | 385/78 |

FOREIGN PATENT DOCUMENTS

| | | | |
|---|---|---|---|
| WO | 01/61870 A2 | 8/2001 | |
| WO | 2004/003612 A1 | 1/2004 | G02B 6/25 |
| WO | 2007/005313 A1 | 1/2007 | A61C 1/08 |
| WO | 2008/103239 A1 | 8/2008 | B23K 26/00 |

OTHER PUBLICATIONS

Cook, R. F., "Toughening of a Cordierite Glass-Ceramic by Compressive Surface Layers," *Journal of American Ceramic Society*, 2005, 88(10), pp. 2798-2808.

Dietz, R. L., "Optical fiber sealing with solder glass: Design Guidelines," *Proceedings of SPIE*, 2004, vol. 5578, pp. 642-651.

* cited by examiner

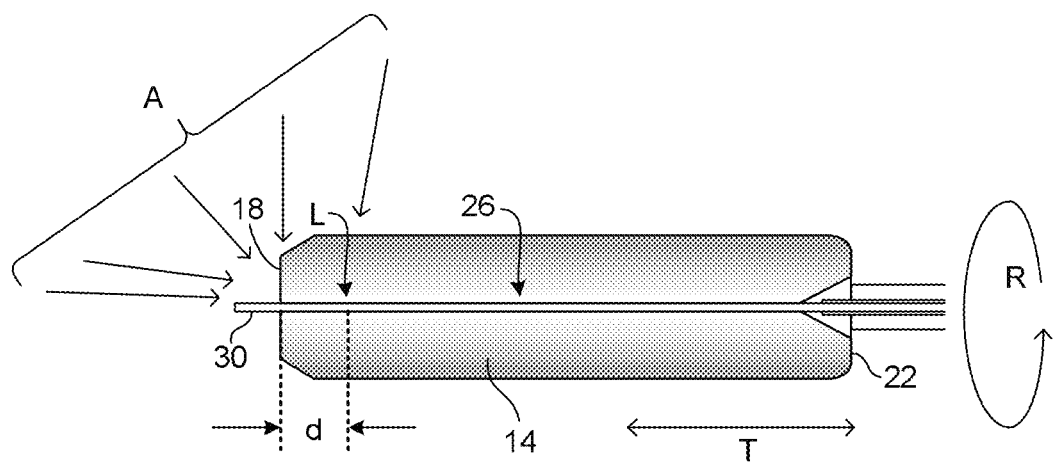
Figure 3
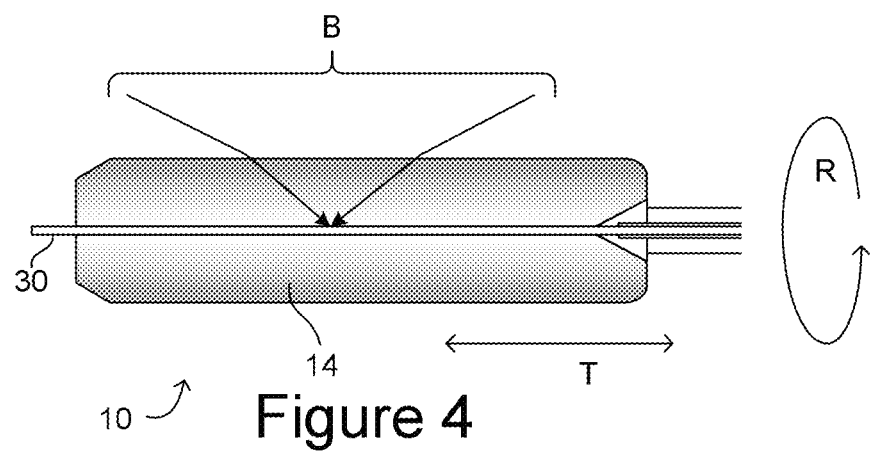
Figure 4
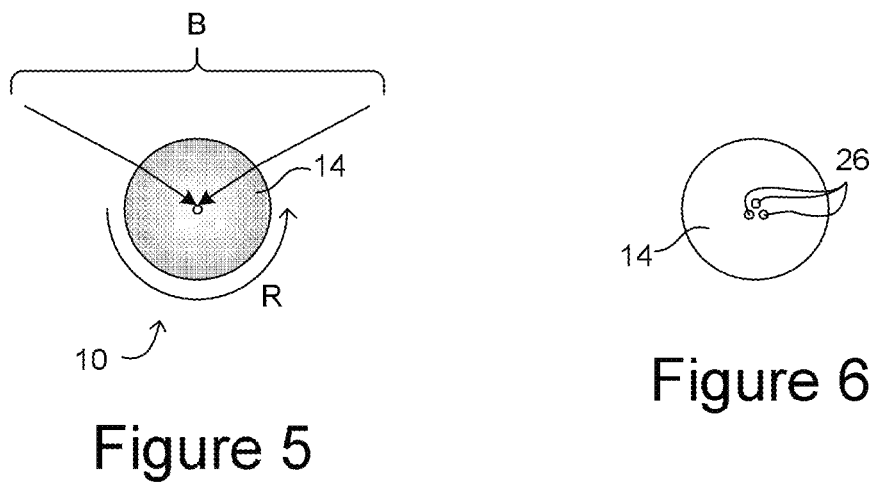
Figure 5
Figure 6

OPTICAL FIBER AND COMPOSITE INORGANIC FERRULE ASSEMBLIES

RELATED APPLICATIONS

This application is a divisional under 35 U.S.C. §120 of U.S. patent application Ser. No. 13/788,861, filed Mar. 7, 2013, which claims priority to U.S. Provisional Application Ser. No. 61/660,235, filed on Jun. 15, 2012, the content both applications being relied upon and incorporated herein by reference in its entirety.

FIELD

The present disclosure relates to optical fiber and ferrule assemblies and methods for assembling optical fibers and ferrules together, and particularly to optical fiber and composite inorganic ferrule assemblies and methods for assembling optical fibers with together with composite inorganic ferrules.

BACKGROUND AND SUMMARY

Fiber and ferrule assemblies are typically formed by securing a glass fiber within a ceramic ferrule by any of various methods, but one of the most common is by use of an epoxy-based adhesive. The ceramic of the ferrule constitutes a relatively tough material with excellent dimensional stability and generally somewhat customizable CTE. While use of epoxy is generally an inexpensive approach, there are significant disadvantages, including the difficulty of achieving repeatable quality in the adhesive bond, typically requiring careful inspection, cold storage, precise mixing, degassing, and careful dispensing of the epoxy. Limited pot life after mixing and undesirably long curing times after application are additional disadvantages of epoxy.

The present disclosure provides according to one aspect, a pre-terminated optical fiber assembly with a ferrule 14 having front and rear opposed faces and at least one fiber bore defined longitudinally therethrough. A glass optical fiber is disposed within the at least one fiber bore, and the fiber is fused to the ferrule at a location at least 1 mm deep inside the bore. The ferrule 14 is desirably composed of an inorganic composite material, the composite comprising a material gradient from at least 75% by volume of a first inorganic material to at least 75% by volume of second inorganic material in the radially inward direction, where the first inorganic material has a fracture toughness of at least 1 MPa·m$^{1/2}$, and the second inorganic material has a softening point of no greater than 1000° C., desirably no greater than 900° C.

According to another aspect, the present disclosure also provides a method of fabricating an optical fiber connector assembly, the method comprising: providing an optical fiber; providing a ferrule having front and rear opposed faces and at least one fiber bore defined longitudinally therethrough; positioning the fiber within the at least one fiber bore; and fusing the fiber to the ferrule at a location at least 1 mm deep inside the at least one fiber bore by irradiating the fiber and ferrule with laser energy. The step of providing a ferrule desirably comprises providing a ferrule comprised of an inorganic composite material, the composite comprising a material gradient from at least 75% by volume of a first inorganic material to at least 75% by volume of second inorganic material in the radially inward direction, with the first inorganic material having a fracture toughness of at least 1 MPa·m$^{1/2}$ and the second inorganic material having a softening point of no greater than 1000° C.

Variations of the methods and devices of the present disclosure are described in the text below and with reference to the figures, described in brief immediately below.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 3 is a cross-sectional diagram of an embodiment of an optical fiber and composite inorganic ferrule assembly according to the present disclosure undergoing laser processing according to a method or process embodiment of the present disclosure;

FIGS. 4 and 5 are diagrammatic cross-sections of an embodiment of an optical fiber and composite inorganic ferrule assembly according to the present disclosure undergoing laser processing according to another method or process embodiment of the present disclosure; and FIG. 6 is a cross-section of an embodiment of an optical fiber and composite inorganic ferrule assembly according to the present disclosure wherein the ferrule has multiple bores.

DETAILED DESCRIPTION

Figure 1:
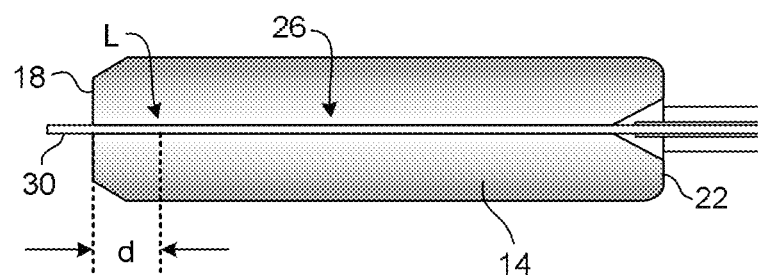
FIG. 1 is a cross-sectional diagram of an optical fiber and composite inorganic ferrule assembly according to an embodiment of the present disclosure.

According to one aspect of the present disclosure, and with particular reference to the cross-sectional diagram of FIG. 1, a pre-terminated optical fiber assembly 10 comprises a ferrule 14 having front and rear opposed faces 18, 22 and at least one fiber bore 26 defined longitudinally therethrough. A glass optical fiber 30 is disposed within the at least one fiber bore 26 of the ferrule 14. The fiber 30 is fused (e.g., merged/melted together; blended to form a single entity) to the ferrule 14 at a location L at least 1 mm deep inside the at least one fiber bore 26, or in other words, at a location L which is a distance d from the front face 18 of the ferrule 14, where d is at least 1 mm (e.g., at least 2 mm, at least 5 mm). The ferrule 14 is composed of an inorganic composite material, the composite comprising a material gradient from at least 75% by volume of a first inorganic material to at least 75% by volume of second inorganic material in the radially inward direction, the first inorganic material having a fracture toughness of at least 1 MPa·m$^{1/2}$, desirably at least 1.5 MPa·m$^{1/2}$, the second inorganic material having a softening point of no greater than 1000° C., desirably no greater than 900° C.

According to one variation of the embodiments of the present disclosure, the fiber 30 is fused to the ferrule 14 along at least 10% of the length of the at least one fiber bore 26, and not just at location L. According to a further variation, fiber 30 is fused to the ferrule 14 along at least 25% of the length of the at least one fiber bore 26, desirably 50%. Alternatively, the fiber 30 may be fused to the ferrule 14 along the entire length of the at least one fiber bore 26.

Figure 2:
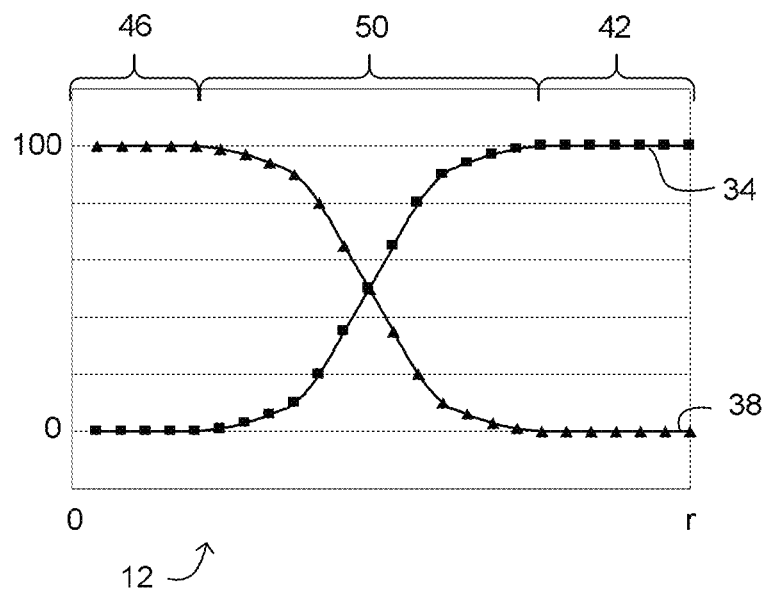
FIG. 2 is a graph of an embodiment of a gradient profile that may be used in embodiments of the devices of the present disclosure.

FIG. 2 shows a plot 12 of an embodiment of a material gradient that may be used with the methods and devices of the present disclosure. The vertical axis represents the percentage by volume of the respective phase or material component of the composite ferrule, with the trace 34 representing the percentage of the first inorganic material and trace 38 representing the percentage of the second inorganic material. The horizontal axis represents the distance along the radius of the ferrule 14, from the center of the ferrule at radius 0 to the full radius r. In the embodiment represented in FIG. 2, there is a region of the ferrule 14, corresponding to region 42 of the plot 12, in which the material of the ferrule is 100% first inorganic material, and a region of the ferrule 14 correspond to region 46 of the plot 12, and a region of the ferrule comprising the material gradient of the ferrule and corresponding to region 50 of the plot 12, in which the respective percentages of both the first material and the second material transition smoothly from their respective values in region 42 to their respective values in region 46. The material gradient of the ferrule desirably comprises a region of the ferrule extending along at least 1/10 of the length of the radius of the ferrule, more desirably at least 1/3, and even more desirably along at least 1/2, as represented by the region 50 of plot 12 extending along about 1/2 or more of the length of the radius r, or in other words, along 1/2 or more of the length of the horizontal axis. The gradual transition from the first inorganic material to the second inorganic material spreads over a relatively large volume any stresses that may arise between the first and second materials over the operating temperature range of the assembly 10, stresses that would otherwise be concentrated at an interface such as at an interface between two layers, rather than spread through region corresponding to at least 1/10 of the length of the radius of the ferrule 14, and desirably greater. In other contemplated embodiments, layers having differing ratios of the first and second materials may provide a stepped transition from the exterior of the ferrule to the bore, such as by increasing the percentage of the second material and correspondingly decreasing the percentage of the first material for each successive layer toward the bore, where the outermost layer has a ratio according to the percentages above corresponding to the outside of the ferrule and the innermost layer has a ratio according to the percentages above corresponding to the center of the ferrule, and where there are at least three discrete layers, such as at least five discrete layers such that the degree of change in CTE at the transition between adjoining layers does not result stresses great enough crack the ferrule or delaminate the layers as the optical fiber is fused therein.

A shown in FIG. 2, the inorganic composite of the ferrule 14 may comprise a material gradient (corresponding to region 50) that extends from at 100% by volume of the first inorganic material to 100% by volume of the second inorganic material, but other variations are possible. According to another embodiment, the composite material may comprise a material gradient from at least 75% by volume of the first inorganic material to at least 90% by volume of the second inorganic material, or from at least 90% by volume of the first inorganic material to at least 75% by volume of the second inorganic material, allowing for the innermost and outermost regions of the ferrule 14 to be formed of composite materials.

Desirably, the first inorganic material comprises or even consists of a ceramic selected to achieve toughness of at least 1 $MPa \cdot m^{1/2}$, desirably at least 1.5 $MPa \cdot m^{1/2}$. Similarly, the second inorganic material desirably comprises or even consists of a glass or a glass material selected to have a softening point of no greater than 1000° C., desirably no greater than 900° C. According to one alternative embodiment, the first inorganic material comprises zirconia. According to a further alternative embodiment, the first inorganic material comprises alumina According to another alternative embodiment, the second inorganic material comprises silica.

According to another aspect of the present disclosure, and with particular reference to the diagrammatic cross section of FIG. 3, a method of fabricating an optical fiber connector assembly 10 is provided. The method includes providing an optical fiber 30, providing a ferrule 14 having front and rear opposed faces 18, 22 and at least one fiber bore 26 defined longitudinally therethrough. The method further comprises positioning the fiber 30 within the at least one fiber bore 26, and fusing the fiber 30 to the ferrule 14 at a location L at least 1 mm deep inside the at least one fiber bore 26, or in other words, at a location L which is a distance d from the front face 18 of the ferrule 14, where d is at least 1 mm.

Fusing is performed by irradiating the fiber and ferrule with laser energy, which desirably travels through at least a portion of the ferrule 14, and may approach the ferrule 14 in any of various directions, such as the directions indicate by the arrows A shown in FIG. 3, including from nearly parallel to the fiber 30 to perpendicular to the fiber, to beyond perpendicular, as shown. The ferrule 14 and fiber 30 may also be rotated in the direction R and translated in the direction T as shown, so as to fuse the fiber 30 to the ferrule 14 at more than just the single location L, such as along at least 10% of the length of the at least one fiber bore 26 or along at least 25%. Desirably, the fiber 30 may even be fused to the ferrule 14 along 50% of the at least one fiber bore 26, or even along the entire length of the bore 26. Either of both of the rotation in the direction R and the translation in the direction T may be performed by moving the laser beam(s) relative to the fiber 30 and ferrule 14, instead of moving the fiber 30 and the ferrule 14 relative to the laser beam(s).

Depending on the ferrule material properties, lasers with wavelengths from about 300 nm to 11000 nm could be used to bond the fiber to the ferrule depending on the relative position, focus, beam density, power, etc. The ferrule would have a bore 26 inner diameter nominally similar to the fiber 30 outer diameter. According to one aspect of this method, a fused silica ferrule or other non-composite inorganic ferrule could be used rather than a composite ferrule, and the laser could be directed at the end face 18 of the ferrule 14, at an angle between 0 and 90 degrees of the fiber optical axis. The fiber 30 could extend beyond the ferrule endface or could be flush with the end face surface during fusing.

According to yet another alternative aspect of the methods of the present inventive and innovative technology, one embodiment of which is represented in the cross sections of FIGS. 4 and 5, the laser beam used to fuse the ferrule 14 and fiber 30 together may take the form of a beam B focused with a short focal length lens to a have an extreme convergence angle, as seen in FIGS. 4 and 5, where the outermost rays of the beam B are represented. The beam B is largely transmissive within the ferrule 14 but develops enough intensity or energy density at the center of the ferrule 14 to bond the fiber 30 to the ferrule. With both relative axial rotation R and translation T, the laser beam B could perform a rapid helical sweep of the bore 26, bonding the entire interface between the fiber 30 and the ferrule 14. This embodiment would work best with ferrules such as fused silica, borosilicate, and glass ceramic, while processes or methods using end face approaching radiation would work best for composite ferrules having a material gradient and a silica center.

According to yet another aspect of the method of the present inventive and innovative technology, a ferrule 14 with multiple bores 26 may be used, such as the ferrule 14 shown in the cross section of FIG. 6. According to another aspect and as mentioned above, the process or method may make use of a non-composite or non-material-gradient type ferrule, as represented in FIG. 6 where the diagrammatic representation of the cross section of the ferrule 14 has no shading gradient, thus representing a ferrule material, such as fused silica, without a material gradient.

According to still another aspect of the method of the present inventive and innovative technology, the relative position of the fiber 30 within the fiber bore 26 may be controlled, both before and especially during the fiber-ferrule bonding step. The laser can be used in two ways to manipulate the fiber's position within the ferrule fiber bore. As one alternative, the laser can be used to rapidly heat and cool the fiber or ferrule to cause surface and density distortion. This distortion can be used to bias the fiber core in a direction opposite the fiber or ferrule growth. Alternatively or in addition, differential bonding and excessive heat/material flow biased on one side of the bore 26 can be used to drive the fiber core in a preferred direction, enabling the process capability to actively position the fiber during the bonding step For the most robust final assembly 10, the method step of providing the ferrule 14 desirably comprises providing a ferrule 14 comprised of an inorganic composite material, the composite comprising a material gradient from at least 75%, desirably as high as 100% by volume of a first inorganic material to at least 75%, desirably as high as 100% by volume of second inorganic material in the radially inward direction. The first inorganic material has a fracture toughness of at least 1 $MPa \cdot m^{1/2}$ desirably at least 1.5 $MPa \cdot m^{1/2}$, and the second inorganic material has a softening point of no greater than 1000° C., desirably no greater than 900° C.

Relative to epoxy-based fiber-ferrule attachment processes, this laser welding process reduces cost, cycle time, and manufacturing complexity, and increases product performance in reliability testing. With no epoxy, there are no consumables. Cycle times are significantly less than 1 minute, and the method allows processing one part at a time (there is no need to batch process). There is no overhead needed to manage and distribute a bonding agent, no limited pot-life, and no limited shelf-life. There is also no viscoelastic response to applied forces at the ferrule end face.

It is noted that terms like "desirably" "preferably," "commonly," and "typically," when utilized herein, are not utilized to limit the scope of the claimed inventive and innovative technology or to imply that certain features are critical, essential, or even important to the structure or function of the claimed inventive and innovative technology. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it will be apparent that modifications and variations are possible without departing from the scope of the inventive and innovative technology defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive and innovative technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An optical fiber assembly, comprising:
a ferrule having front and rear opposed faces and at least one fiber bore defined longitudinally therethrough; and
a glass optical fiber disposed within the at least one fiber bore of the ferrule;
wherein the fiber is fused to the ferrule at a location at least 1 mm deep inside the at least one fiber bore;
wherein the ferrule is composed of an inorganic composite material, the inorganic composite comprising a material gradient from at least 75% by volume of a first inorganic material to at least 75% by volume of a second inorganic material in the radially inward direction, the first inorganic material having a fracture toughness of at least 1 $MPa \cdot m^{1/2}$, the second inorganic material having a softening point of no greater than 1000° C. and
wherein the material gradient of the ferrule transitions either:
(a) by including both the first and second inorganic materials in the transition while continuously changing the respective percentages by volume thereof with respect to a distance through the transition over a length radially inward through the ferrule of at least 1/10 of a radius of the ferrule; or
(b) in a stepped manner from the at least 75% by volume of the first inorganic material to the at least 75% by volume of the second inorganic material in the radially inward direction, wherein the stepped transition includes layers having both the first and second inorganic materials in the respective layers but with differing ratios of the first and second inorganic materials relative to one another.

2. The optical fiber assembly of claim 1, wherein the material gradient of the ferrule transitions in the stepped manner and comprises a region of the ferrule extending along at least 1/10 of the length of the radius of the ferrule.

3. The optical fiber assembly of claim 1, wherein the material gradient of the ferrule comprises a region of the ferrule extending along at least 1/3 of the length of the radius of the ferrule.

4. The optical fiber of claim 1, wherein the material gradient of the ferrule comprises a region of the ferrule extending along at least 1/2 of the length of the radius of the ferrule.

5. The optical fiber of claim 1, wherein the fiber is fused to the ferrule along at least 10% of the length of the at least one fiber bore.

6. The optical fiber of claim 1, wherein the fiber is fused to the ferrule along at least 25% of the length of the at least one fiber bore.

7. The optical fiber of claim 1, wherein the fiber is fused to the ferrule along at least 50% of the length of the at least one fiber bore.

8. The optical fiber of claim 1, wherein the fiber is fused to the ferrule along the entire length of the at least one fiber bore.

9. The optical fiber assembly of claim 1, wherein the first inorganic material has a fracture toughness of at least 1.5 $MPa \cdot m^{1/2}$.

10. The optical fiber assembly of claim 1, wherein the second inorganic material has a softening point of no greater than 900° C.

11. The optical fiber assembly of claim 1, wherein the composite comprises a material gradient from at least 75% by volume of the first inorganic material to at least 90% by volume of the second inorganic material.

12. The optical fiber assembly of claim 1, wherein the composite comprises a material gradient from at least 90% by volume of the first inorganic material to at least 75% by volume of the second inorganic material.

13. The optical fiber assembly of claim 1, wherein the composite comprises a material gradient from at 100% by volume of the first inorganic material to 100% by volume of the second inorganic material.

14. The optical fiber assembly of claim 1, wherein the first inorganic material comprises a ceramic.

15. The optical fiber assembly of claim 14, wherein the first inorganic material comprises zirconia.

16. The optical fiber assembly of claim 14, wherein the first inorganic material comprises alumina.

17. The optical fiber assembly of claim 1, wherein the second inorganic material comprises a glass.

18. The optical fiber assembly of claim 1, wherein the second inorganic material comprises silica.

19. An optical fiber assembly, comprising:
a ferrule having front and rear opposed faces and at least one fiber bore defined longitudinally therethrough;
wherein the ferrule is composed of an inorganic composite material, the inorganic composite material comprising a material gradient from at least 75% by volume of a first inorganic material to at least 75% by a volume of second inorganic material in a radially inward direction, wherein the first inorganic material comprises a ceramic, and wherein the second inorganic material comprises silica;
wherein the material gradient of the ferrule transitions in a stepped manner from the at least 75% by volume of ceramic material to the at least 75% by volume of glass material in the radially inward direction; and
wherein the stepped transition includes layers having both glass and ceramic materials in the respective layers but with differing ratios of the ceramic and glass materials relative to one another.

20. The optical fiber assembly of claim 19, wherein the ceramic comprises at least one of alumina and zirconia.

21. The optical fiber assembly of claim 20, wherein the silica comprises fused silica.

22. The optical fiber assembly of claim 19, wherein the first inorganic material has a fracture toughness of at least 1 $MPa \cdot m^{1/2}$.

23. The optical fiber assembly of claim 19, wherein the second inorganic material has a softening point of no greater than 1000° C.

24. The optical fiber assembly of claim 19, wherein the material gradient of the ferrule comprises a region of the ferrule extending along at least 1/10 of the length of the radius of the ferrule.

25. The optical fiber assembly of claim 24, wherein the material gradient is continuous in the region.

26. The optical fiber assembly of claim 19, further comprising an optical fiber fused to an interior of the ferrule within the bore.

27. The optical fiber assembly of claim 1, wherein the material gradient of the ferrule transitions in the stepped manner, and wherein the stepped transition includes at least five discrete layers.

28. The optical fiber assembly of claim 19, wherein the stepped transition includes at least five discrete layers.

29. An optical fiber assembly, comprising:
a ferrule having front and rear opposed faces and at least one fiber bore defined longitudinally therethrough;
wherein the ferrule is composed of a composite material, the composite material comprising a material gradient from at least 75% by volume of a ceramic material to at least 75% by volume of glass material in a radially inward direction; and
wherein the material gradient of the ferrule transitions by including both the glass and ceramic materials in the transition while continuously changing the respective percentages by volume thereof with respect to a distance through the transition over a length radially inward through the ferrule of at least 1/10 of a radius of the ferrule.

30. The optical fiber assembly of claim 29, further comprising an optical fiber fused to an interior of the ferrule within the bore.

* * * * *